US011498128B2

(12) United States Patent
Vaughan et al.

(10) Patent No.: US 11,498,128 B2
(45) Date of Patent: Nov. 15, 2022

(54) MANUFACTURING APPARATUS COMPRISING COLLOCATED REDUCTION APPARATUS, PROCESSOR AND ADDITIVE-MANUFACTURING APPARATUS

(71) Applicant: METALYSIS LIMITED, Rotherham (GB)

(72) Inventors: Dion Vaughan, Rotherham (GB); Melchiorre Conti, Rotherham (GB)

(73) Assignee: METALYSIS LIMITED, Rotherham (GB)

( * ) Notice: Subject to any disclaimer, the term of this patent is extended or adjusted under 35 U.S.C. 154(b) by 663 days.

(21) Appl. No.: 16/302,419

(22) PCT Filed: May 24, 2017

(86) PCT No.: PCT/GB2017/051454
§ 371 (c)(1),
(2) Date: Nov. 16, 2018

(87) PCT Pub. No.: WO2017/203245
PCT Pub. Date: Nov. 30, 2017

(65) Prior Publication Data
US 2019/0275589 A1    Sep. 12, 2019

(30) Foreign Application Priority Data
May 24, 2016    (GB) ...................... 1609141

(51) Int. Cl.
*B33Y 10/00* (2015.01)
*B33Y 30/00* (2015.01)
(Continued)

(52) U.S. Cl.
CPC .............. *B22F 9/20* (2013.01); *B22D 23/003* (2013.01); *B22F 1/052* (2022.01); *B22F 1/065* (2022.01);
(Continued)

(58) Field of Classification Search
CPC .......... B22F 9/20; B22F 10/20; B22F 1/0014; B22F 1/0048; B22F 3/115; B22F 10/30;
(Continued)

(56) References Cited

U.S. PATENT DOCUMENTS

2013/0065073 A1    3/2013    Fuwa
2014/0165783 A1*   6/2014    Monk ..................... C22B 7/005
                                                    75/10.67
(Continued)

FOREIGN PATENT DOCUMENTS

CN    102905821 A    1/2013
CN    204934612 U    1/2016
(Continued)

OTHER PUBLICATIONS

Seyda, V. et al. "Investigation of aging processes of Ti-6A1-4V powder material in laser melting" *Physics Procedia*, 2012, 39:425-431.
(Continued)

*Primary Examiner* — Rebecca Janssen
(74) *Attorney, Agent, or Firm* — Saliwanchik, Lloyd & Eisenschenk

(57) ABSTRACT

A method and an apparatus for manufacturing a metallic article involve providing a non-metallic feedstock, for example in the form of an oxide of a desired metal or a mixture of oxides of the components of a desired metal alloy. A manufacturing apparatus has a reduction apparatus for electrochemically reducing the feedstock to a metallic product and a processor for converting the metallic product to a metallic powder. The powder is fed into an additive-manufacturing apparatus for fabricating the metallic article from the metallic powder. At least the reduction apparatus and the processor, and preferably also the additive-manu-
(Continued)

facturing apparatus, are collocated, or located in the same container, or in the same building, or on the same site.

25 Claims, 3 Drawing Sheets

(51) Int. Cl.
| | |
|---|---|
| *B33Y 40/00* | (2020.01) |
| *B33Y 70/00* | (2020.01) |
| *B23K 26/342* | (2014.01) |
| *B23K 26/00* | (2014.01) |
| *C23C 4/18* | (2006.01) |
| *C25C 7/00* | (2006.01) |
| *C25C 7/08* | (2006.01) |
| *C25C 7/06* | (2006.01) |
| *B22F 10/20* | (2021.01) |
| *B22F 1/065* | (2022.01) |
| *B22F 9/20* | (2006.01) |
| *B33Y 50/02* | (2015.01) |
| *C23C 4/123* | (2016.01) |
| *B22D 23/00* | (2006.01) |
| *B22F 3/115* | (2006.01) |
| *C22B 34/12* | (2006.01) |
| *C25C 3/28* | (2006.01) |
| *C25C 5/04* | (2006.01) |
| *B22F 1/052* | (2022.01) |
| *B23K 103/14* | (2006.01) |
| *C22C 1/04* | (2006.01) |
| *B22F 10/30* | (2021.01) |

(52) U.S. Cl.
CPC .............. *B22F 3/115* (2013.01); *B22F 10/20* (2021.01); *B23K 26/0006* (2013.01); *B23K 26/342* (2015.10); *B33Y 10/00* (2014.12); *B33Y 30/00* (2014.12); *B33Y 40/00* (2014.12); *B33Y 50/02* (2014.12); *B33Y 70/00* (2014.12); *C22B 34/1263* (2013.01); *C23C 4/123* (2016.01); *C23C 4/185* (2013.01); *C25C 3/28* (2013.01); *C25C 5/04* (2013.01); *C25C 7/007* (2013.01); *C25C 7/06* (2013.01); *C25C 7/08* (2013.01); *B22F 10/30* (2021.01); *B22F 2301/205* (2013.01); *B23K 2103/14* (2018.08); *C22C 1/0458* (2013.01); *Y02P 10/25* (2015.11)

(58) Field of Classification Search
CPC .... B22F 2301/205; B22F 12/00; B22F 10/10; B22F 10/00; C25C 7/08; C25C 7/06; C25C 3/28; C25C 5/04; C25C 7/007; B33Y 10/00; B33Y 30/00; B33Y 40/00; B33Y 50/02; B33Y 70/00; B23K 26/342; B23K 26/0006; B23K 2103/14; C23C 4/123; C23C 4/185; B22D 23/003; C22B 34/1263; Y02P 10/25; C22C 1/0458
See application file for complete search history.

(56) References Cited

U.S. PATENT DOCUMENTS

| | | | |
|---|---|---|---|
| 2014/0186205 A1* | 7/2014 | O'Neill | B22F 1/0088 419/26 |
| 2014/0231262 A1* | 8/2014 | Rao | C25C 7/025 205/50 |
| 2015/0034123 A1* | 2/2015 | Pressacco | B22F 9/04 134/10 |
| 2017/0151609 A1* | 6/2017 | Elsen | B22F 3/15 |

FOREIGN PATENT DOCUMENTS

| | | |
|---|---|---|
| WO | WO 99/064638 | 12/1999 |
| WO | WO-2005/038092 | 4/2005 |
| WO | WO-2006/010228 | 2/2006 |
| WO | WO 2011/149101 | 12/2011 |
| WO | WO-2013/050772 | 4/2013 |

OTHER PUBLICATIONS

Office Action dated Sep. 2, 2020 in Chinese Patent Application No. 201780031704.7.

* cited by examiner

MANUFACTURING APPARATUS COMPRISING COLLOCATED REDUCTION APPARATUS, PROCESSOR AND ADDITIVE-MANUFACTURING APPARATUS

CROSS-REFERENCE TO RELATED APPLICATION

This application is the National Stage of International Application Number PCT/GB2017/051454, filed May 24, 2017, which is hereby incorporated by reference herein in its entirety, including any figures, tables, nucleic acid sequences, amino acid sequences, or drawings.

The invention relates to an apparatus and a method for manufacturing a metallic article, and to a metallic article, and in particular to an apparatus, method and article involving additive manufacturing.

BACKGROUND

Titanium is conventionally commercially manufactured using the Kroll and Hunter processes. These processes are carried out at very large scale, are energy intensive and involve the use of polluting materials, such as chlorine. The product of both processes is a solid mass of titanium sponge, and substantial further cost and energy consumption is required to fabricate titanium or titanium alloy articles from the titanium sponge, using consolidation, remelting and machining processes.

It is instructive to consider the ratio between the mass of titanium sponge that has to be manufactured using the Kroll or Hunter process to the mass of titanium which is used in a finished product made from that titanium sponge. (Titanium or titanium alloy components are often specified for use in aeroplanes because of the high strength and low density of titanium, and so the skilled person sometimes refers to the ratio mentioned above as the "buy-to-fly" ratio.) The ratio is typically between 3:1 and 10:1. The wasted material is typically lost during machining, and has an undesirably-high oxygen content, such that it cannot easily be recycled. The high "buy-to-fly" ratio is an important factor in the high cost of conventional titanium manufactured articles, and the undesirably-high embedded energy in those articles.

Although these considerations are described here with reference to titanium and titanium alloys, similar problems arise in the fabrication of articles made from other metals.

There is therefore a technical and commercial need for an alternative approach to the fabrication of metal articles such as titanium and titanium alloy articles.

SUMMARY OF INVENTION

The invention provides an apparatus, a method, a product, a control system and a control method as defined in the appended independent claims, to which reference should now be made. Preferred or advantageous features of the invention are set out in dependent subclaims.

In a first aspect, the invention may thus provide an apparatus for manufacturing a metallic article, comprising a reduction apparatus for electrochemically reducing a feedstock to a metallic product, a processor for converting the metallic product to a metallic powder, and an additive-manufacturing apparatus for fabricating the metallic article from the metallic powder. Preferably, the reduction apparatus, the processor and the additive-manufacturing apparatus are collocated, or are located on the same site, and may be arranged and controlled, by a suitably-programmed controller, to operate synergistically. For example, the reduction apparatus may be controlled to produce a desired metallic product, for processing by the processor to form a desired metallic powder. The powder is then input to the additive-manufacturing apparatus to fabricate a desired article. The reduction apparatus and the processor may thus be controlled so as to produce the desired metallic powder only when, or shortly before, that powder is required for use in the additive-manufacturing apparatus, reducing waste and reducing the need to store, or stockpile, powder that is not yet required for additive manufacturing.

By contrast, conventional additive-manufacturing processes require the storage or transport of the metallic powder. Eliminating these requirements is particularly important for certain metallic materials, such as titanium and titanium alloys, where storage and transport conditions must be carefully controlled, both in order to prevent degradation of the powder and to avoid safety risks such as the risk of fire.

In this document, references to titanium alloys may be taken to include titanium-based alloys, containing more than 50 wt % titanium.

For convenience of installation and operation, the reduction apparatus, the processor and the additive-manufacturing apparatus may be located in a container or a portable building. This container or building may be portable to enable the apparatus to be manufactured and assembled at a central location, such as a factory, before the apparatus is transported as a unit to a location where metallic articles are to be manufactured. The apparatus may be transported by any convenient method, such as any container transport method.

Such apparatus may be transportable to, for example, a building construction site, or a temporary factory, or a disaster area, where it may be desirable to be able to manufacture metallic articles. Additive manufacturing in such settings allows great freedom to make different shaped articles, and the apparatus allows the use of different feedstocks, so that metallic articles may be made of different metals or alloys, as required.

Advantageously, the collocated apparatus may be implemented in otherwise inaccessible locations, such as on a ship, where it may be desirable to be able to manufacture metallic articles. A further advantage in such a location is that it is only necessary to store non-metallic feedstock for the manufacturing process, rather than storing metallic powder for additive manufacturing, which may be flammable or may deteriorate over time through oxidation.

Preferably, the reduction apparatus comprises an electrochemical cell in which, in use, an anode and a cathode are in contact with a fused salt and the feedstock contacts the cathode and the fused salt. An electrical power supply applies a cathode potential to the cathode so that the feedstock is reduced to the metallic product. The electroreduction, or electrodecomposition, process described for example in WO99/64638 may therefore be used. The feedstock is preferably in the form of a powder, and it is preferably reduced to a metallic product in the form of metallic particles corresponding to the particles of the feedstock powder. (The metallic particles in the product may be partially sintered by the reduction process, and can preferably be separated by a crushing or comminuting process.)

In addition, the reduction apparatus may comprise a loading unit for loading the feedstock onto a cathode, and a pre-heat unit for heating the feedstock and the cathode for immersion into the fused salt, in order to avoid thermal shock, or undesirable cooling of the fused salt on immersion of the cathode. The cathode may be a tray-shaped cathode comprising a flat base and a raised peripheral flange at the edge for retaining a bed of a feedstock in the form of powder. After reduction, the cathode carrying the metallic product is advantageously removable from the electrochemical cell, and movable into a cooling unit for cooling the cathode and the metallic product before the metallic product is processed by the processor.

In a preferred embodiment, the cathode carrying the feedstock is movable horizontally within, or from, the loading unit until it is positioned beneath the anode, and the anode and the cathode can then be lowered vertically into the fused salt. After reduction of the feedstock to produce the metallic product, the anode and the cathode carrying the metallic product may be raised vertically out of the fused salt, before the cathode carrying the metallic product is moved horizontally into the cooling unit. The horizontal movement of the cathode and the feedstock, and the cathode and the metallic product after reduction, is selected in order to enhance the automation of the reduction process, and to enable the loading unit and the cooling unit to be conveniently positioned alongside the electrochemical cell to reduce the volume of the apparatus and the space required to house it. The horizontal and vertical movements of the cathode, and the vertical movement of the anode, may then be controlled and performed by automated machinery.

After electro-reduction, the metallic product is handled by the processor, where first it is preferably washed to remove any of the salt remaining on the product after cooling. The processor may additionally comprise a comminutor, or crushing apparatus, for comminuting or crushing the metallic product to produce metallic particles of the metallic product. These particles may not all be of the same shape or size, but it may be possible to use the metallic particles as the metallic powder for additive manufacturing after this comminution process, without further processing steps, if the nature of the particles is suitable for input to the additive-manufacturing process. For example, an additive-manufacturing process such as plasma spraying may be relatively tolerant of the size and shape of the particles and so the comminuted particles may be suitable for this.

Other additive-manufacturing processes may require further processing of the particles before they can be used, and the processor may then comprise a classifier or screening apparatus for selecting a predetermined range of sizes of the metallic particles which are to form the metallic powder. The processor may additionally comprise a spheroidising apparatus for spheroidising the classified metallic particles to produce the metallic powder.

Depending on the feedstock used for the electrolytic reduction, the metallic particles may include particles, such as impurity particles, that should be removed before the additive-manufacturing process. If the additive-manufacturing process is to use a titanium powder for example, the titanium feedstock may contain impurities such as iron, which is commonly found in combination with titanium ores. In that case, the processor may comprise an apparatus for removing undesired particles, such as impurity particles. This apparatus might comprise, for example, a magnetic separator for separating ferromagnetic particles from non-ferromagnetic particles in the metallic particles, or a floatation apparatus for removing low or high density particles.

The feedstock is advantageously in the form of a powder of a metallic compound, or a mixture of metallic compounds, containing the metallic elements required for the desired metallic powder. The feedstock may have a particle size or particle size distribution that, when reduced, produces a suitable particle size or particle size distribution for the metallic powder.

In a preferred embodiment, the additive-manufacturing apparatus may comprise an apparatus such as a 3D printer, a selective laser melting machine, a selective laser sintering machine, a selective electron-beam melting machine, or other apparatus for manufacturing the desired metallic article from the metallic powder. Another option may thus be a spray-coating apparatus, such as a plasma-spray-coating apparatus.

In many types of additive-manufacturing apparatus, a significant proportion of the metallic powder supplied to the additive-manufacturing apparatus does not form part of the metallic product, but is oxidised by the additive-manufacturing process to form oxidised metallic powder. For example in a 3D printing apparatus such as a selective laser melting apparatus, successive layers of metallic powder are deposited in a bed of the apparatus, and each layer is scanned by the laser to melt the powder locally and to form the desired article. Powder that is not melted to form part of the article can be removed from the bed and in some cases may be reused for additive-manufacturing of further products, but in many cases it cannot be reused because the powder close to the scanning laser or electron beam is heated during the additive manufacturing and may be degraded by that heating even if the selective melting process is carried out under an inert gas. For example, if the powder is titanium powder, the heating causes dissolution of the oxide surface layer into the bulk of the particles that have been heated. On cooling, the oxygen remains in the bulk, and when the particle is exposed to air a new surface oxide layer forms. In this way the oxygen content of the particle increases, so that the additive-manufacturing process produces oxidised metallic particles (despite being carried out in an inert atmosphere).

According to a further aspect of the invention, this problem may be addressed by recycling the oxidised metallic powder through the electrolytic cell. In other words, the oxidised metallic powder produced by the additive-manufacturing process may be used as the feedstock, or as a component of the feedstock, of the reduction apparatus. The oxidised metallic powder may in this way be efficiently processed to reduce its oxygen content and to optimise it for further use in the additive-manufacturing apparatus.

The oxidised metallic powder may be loaded by itself onto a cathode for electrolytic reduction, or it may be mixed with new feedstock, in the form of metal compound or ore for producing the desired metallic powder. The decision as to which option to take depends on the desired composition of the metallic powder, and the quantities of the oxidised metallic powder and new feedstock available. It may be beneficial to mix a portion of the oxidised metallic powder with a portion of new feedstock on a cathode in order to accelerate the electro-reduction of the new feedstock by improving electrical conduction through the mass of feedstock on the cathode, due to the metallic nature of the oxidised metallic powder mixed with the non-conductive metal-compound feedstock powder.

A significant advantage of preferred embodiments of the present invention lies in the flexibility of the apparatus to produce metallic articles from a wide range of different metallic compositions, including high-performance metallic compositions for technically-advanced applications, such as for medical equipment, or for medical implants, or for aerospace applications. Control of the quality of the metallic powder used for additive manufacturing of such articles is very important, as is control of the alloy composition to be used. If an additive-manufacturing apparatus is to be able to fabricate articles for a variety of applications, it is necessary to supply to the additive-manufacturing apparatus high-quality metal powders of the specific alloy composition required for each application. To provide such flexibility and high quality an additive-manufacturing operator would normally have to maintain stocks of each alloy that they might need, and to store those stocks in suitably-controlled conditions, but by collocating the electrolytic reduction apparatus with the additive-manufacturing apparatus, the operator can simply manufacture on site the desired metallic powder, solving the problem of the prior art and offering a flexible and high-quality manufacturing system.

In order to achieve these objects, it is desirable that a suitable feedstock is selected and provided, comprising one or more compounds containing elements corresponding to the elements forming the desired metallic product. It is also desirable that the reduction and processing steps are carried out appropriately to reduce that feedstock to the desired metallic product, and that the processor is controlled to produce the desired metallic powder. To achieve this, in a preferred aspect of the invention, the apparatus is controlled by a suitably-programmed controller, and optionally the controller is in communication with a remote server which can provide expert system control. For example, a system operator may provide or install an apparatus embodying the invention, for reducing a feedstock and producing metallic articles by additive manufacturing. When a desired metal alloy is required for making a metallic article, the system operator may then provide or specify a suitable feedstock for the electrochemical cell, and may provide control parameters, for example from the remote server to a locally-situated controller, to control the apparatus to produce the desired metallic powder and even to fabricate the desired metallic article.

In this way, the production of the metallic article may be automated as far as possible by using the expert system operated by the remote server (or system controller), in combination with a local controller of the apparatus.

In a preferred embodiment, the system operator may provide pre-packaged quantities of feedstock for electrolytic reduction. In combination with the expert system control provided by the remote server, this may advantageously ensure high performance of the apparatus and a high-quality product, despite requirements for different alloys for making different metallic articles at different times.

The expert system or remote server may also advantageously receive feedback from the apparatus, in order to maintain control during operation of the apparatus. Feedback may also be used if the apparatus is used to reduce a feedstock that has been prepared on site, such as a feedstock comprising a mixture of a metallic compound and oxidised metallic powder produced by the additive-manufacturing process, as described above.

Feedstock parameters may advantageously be selected in order to produce not only a product having a desired composition but also other desired properties, such as a desired particle size. Thus, for example, a feedstock may comprise particles within a particular size range that is known to be reducible to metallic particles having a desired, smaller, particle size range. This may minimise wastage of the metallic material in the processor.

It should be noted that one remote server may be coupled to and control multiple manufacturing apparatus embodying the invention, which may be at different locations.

The system operator may update the control provided by the remote server, if required, so as continuously to provide effective control of all of the manufacturing apparatus to which it is connected.

In order to maintain the desired flexibility of manufacture, the electrochemical cell and the processor are advantageously specified to be able to produce a quantity of metallic powder that is suitable for consumption by the additive-manufacturing apparatus with which they are collocated. Thus, for example, the apparatus may advantageously be capable of producing between 6 kg and 12 kg of the metallic powder per day. The total size of the apparatus may therefore advantageously be much smaller than conventional machines for producing metallic products. With reference to titanium, for example, the apparatus may advantageously be much smaller than a Kroll reactor.

Embodiments of the invention may thus provide numerous advantages. For example, it may address the relatively inefficient ways in which materials such as titanium powder are obtained today. Other considerations are the health and safety implications of stocking large amount of titanium powders, well known for their flammability; flammability is also related to the size of the powder the finer the powder the more flammable it is. By reducing or eliminating the need to store or transport the metallic powder, the invention may solve these problems. Rather than buy and stock large amounts of costly and dangerous powders, the invention may advantageously provide an all-encompassing machine that can process an oxide feed to a metal powder to be utilised in conjunction with a 3D printer. The apparatus may also synergistically enable regeneration of out-of-specification powders, which have drifted off-specification with regards to oxygen content because of thermal cycling in a 3D printer as described above. Normally, regeneration of oxidised powder would require waste powder to be returned to a powder manufacturer to be de-oxidised off-site and then returned to the additive manufacturer. The invention may advantageously provide a small-footprint production unit with a collocated post-processing unit that may clean, dry and bag powder for utilisation in a 3D printer, as well as recycle powders oxidised in the 3D printer, all enabled in one machine on one site.

The invention may also provide a method for manufacturing a metallic article by operation of the apparatus described herein, and a metallic product manufactured using the method or apparatus.

In summary, therefore, the invention may advantageously provide an apparatus and a method as set out in the following numbered paragraphs, which set out preferred features of the apparatus and method.

1. An apparatus for manufacturing a metallic article, comprising:
a reduction apparatus for electrochemically reducing a feedstock to a metallic product;
a processor for converting the metallic product to a metallic powder; and
an additive-manufacturing apparatus for fabricating the metallic article from the metallic powder.

2. A reduction apparatus according to paragraph 1, in which the processor and the additive-manufacturing apparatus are collocated, or are located on the same site.

3. An additive-manufacturing apparatus according to paragraph 1 or 2, in which the reduction apparatus, the processor and the additive-manufacturing apparatus are located in a container or a portable building.

4. An apparatus according to any preceding numbered paragraph, in which the reduction apparatus comprises an electrochemical cell in which, in use, an anode and a cathode are in contact with a fused salt and the feedstock contacts the cathode and the fused salt, and an electrical power supply for applying a cathode potential to the cathode so that the feedstock is reduced to the metallic product.

5. An apparatus according to paragraph 4, in which the reduction apparatus comprises a loading unit for loading the feedstock onto a cathode and a pre-heat unit for heating the feedstock and the cathode for immersion into the fused salt.

6. An apparatus according to paragraph 4 or 5, in which the cathode carrying the metallic product is removable from the electrochemical cell, and in which the reduction apparatus comprises a cooling unit for cooling the cathode and the metallic product before the metallic product is processed by the processor.

7. An apparatus according to paragraph 5 or 6, in which, after the feedstock is loaded onto the cathode in the loading unit, the cathode carrying the feedstock is moved horizontally until it is positioned beneath the anode, and the anode and the cathode are then lowered into the fused salt.

8. An apparatus according to paragraph 5, 6 or 7, in which, after reduction of the feedstock to produce the metallic product, the anode and the cathode carrying the metallic product are raised out of the fused salt, before the cathode carrying the metallic product is moved horizontally into the cooling unit.

9. An apparatus according to any preceding paragraph, in which the processor comprises a comminutor for comminuting the metallic product to produce metallic particles of the metallic product, and preferably also a classifier or screening apparatus for selecting a predetermined range of sizes of the metallic particles to form the metallic powder.

10. An apparatus according to paragraph 9, in which the processor comprises a spheroidising apparatus for spheroidising the metallic particles to produce the metallic powder.

11. An apparatus according to paragraph 9 or 10, in which the processor comprises a magnetic separator for separating ferromagnetic particles from non-ferromagnetic particles in the metallic particles or the metallic powder.

12. An apparatus according to any preceding paragraph, in which the additive-manufacturing apparatus comprises a 3D printer, such as a selective laser melting machine, a selective laser sintering machine, or a selective electron-beam melting machine.

13. An apparatus according to any preceding paragraph, in which the additive-manufacturing apparatus comprises a spray-coating apparatus, such as a plasma-spray-coating apparatus.

14. An apparatus according to any preceding paragraph in which the metallic powder comprises titanium or a titanium-based alloy.

15. An apparatus according to any preceding paragraph, in which a portion of the metallic powder supplied to the additive-manufacturing apparatus does not form part of the metallic product, but is oxidised by the additive-manufacturing process to form oxidised metallic powder, and in which the oxidised metallic powder is supplied as the feedstock, or as a component of the feedstock, to the reduction apparatus.

16. An apparatus according to any preceding paragraph, in which the feedstock comprises a compound containing elements corresponding to the elements forming the metallic product.

17. An apparatus according to any preceding paragraph, in which the feedstock comprises a naturally-occurring ore of the elements forming the metallic product, such as rutile.

18. An apparatus according to any preceding paragraph, which is capable of producing between 6 kg and 12 kg of the metallic powder per day.

19. A method for manufacturing a metallic article from a powder feedstock, comprising controlling the electrochemical reduction of a predetermined feedstock to produce a metallic product, the conversion of the metallic product to a metallic powder, and the fabrication of the metallic article from the metallic powder by additive manufacturing.

20. A method according to paragraph 19, comprising the steps of loading the feedstock onto a cathode, pre-heating the feedstock and the cathode and then immersing them in a fused salt for electro-reduction of the feedstock.

21. A method according to paragraph 20, comprising the steps of removing the cathode carrying the metallic product from the electrochemical cell, and cooling the cathode and the metallic product before the metallic product is processed by the processor.

22. A method according to paragraph 20 or 21, comprising the steps of, after the feedstock is loaded onto the cathode, moving the cathode carrying the feedstock horizontally until it is positioned beneath an anode, and lowering the anode and the cathode into the fused salt.

23. A method according to paragraph 20, 21 or 22, comprising the steps of, after reduction of the feedstock to produce the metallic product, raising the anode and the cathode carrying the metallic product out of the fused salt, before moving the cathode carrying the metallic product horizontally into a cooling unit.

24. A method according to any of paragraphs 19 to 23, in which the conversion of the metallic product comprises comminuting the metallic product to produce metallic particles of the metallic product, and classifying or screening the metallic particles to select a predetermined range of sizes of the metallic particles to form the metallic powder.

25. A method according to any of paragraphs 19 to 24, in which the conversion of the metallic product comprises spheroidising the metallic particles to form the metallic powder.

26. A method according to any of paragraphs 19 to 25, in which the conversion of the metallic product comprises magnetically separating ferromagnetic particles from non-ferromagnetic particles in the metallic particles or the metallic powder.

27. A method according to any of paragraphs 19 to 26, in which in which the metallic powder comprises titanium or a titanium-based alloy.

28. A method according to any of paragraphs 19 to 27, in which a portion of the metallic powder supplied to the additive-manufacturing apparatus does not form part of the metallic product, but is oxidised by the additive-manufacturing process to form oxidised metallic powder, and in which the method comprises the step of supplying the oxidised metallic powder as the feedstock, or as a component of the feedstock, to the reduction apparatus.

29. A method according to any of paragraphs 19 to 28, comprising controlling the apparatus to produce between 6 kg and 12 kg of the metallic powder per day.

DESCRIPTION OF SPECIFIC EMBODIMENTS AND BEST MODE OF THE INVENTION

Specific embodiments of the invention will now be described by way of example, with reference to the accompanying drawings, in which.

Figure 1:
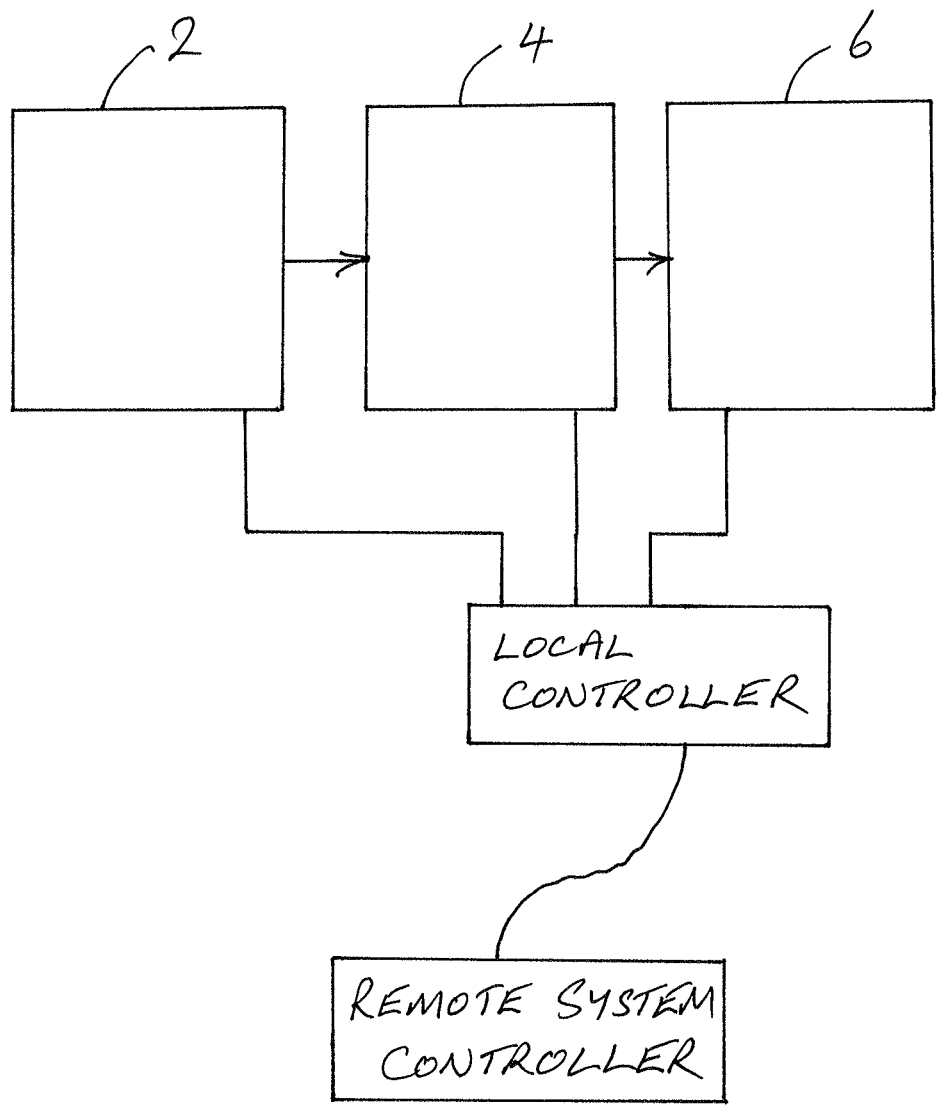
FIG. 1 is a schematic diagram of a first embodiment of the invention.

A first embodiment of the invention is a highly-automated system that produces 6 to 12 kg of titanium and/or titanium alloy powder per 24 hours cycle with a reduced footprint compared to comparable conventional apparatus. The system, or unit, encompasses a reduction apparatus 2, a processor 4, and a selective laser melting apparatus 6. The reduction apparatus comprises an electrochemical cell for reducing a feedstock, which is either in the form of a powder of a metal compound, or a powder of oxidised metal (produced as a by-product of an additive manufacturing process), or a mixture of the two. The processor comprises stages for processing the metallic product of the reduction stage and product cleaning, sizing and bagging in inert atmosphere.

The size and design of the unit in this embodiment is based on the material feed requirements of the selective laser melting (SLM) machine 6. Such machines have an average bed mass of 50 to 70 kg and a deposition rate between 40 and 160 g/h for a total of about 2.4 kg/day. Electron beam melting (EBM) machines typically have a somewhat smaller bed mass between 20 to 50 kg but a faster deposition rate around 500 g/h which equates to a metallic powder feed requirement of about 12 kg/day. Embodiments of the invention could be constructed to cover either of these scenarios.

In operation, a feedstock is charged onto a cathode tray that is then put in a pre-heat apparatus 8. A tray transport machine 10 moves the tray from the pre-heat to the electrochemical reduction chamber 12 and when the electroreduction cycle is over it moves the tray with reduced metallic product on it in to a cooling station 14. The reduction apparatus is then ready to accept another tray to continue the cycle. The tray will then be taken when at room temperature and enters the processor 4, where it is soaked in a bath (not shown) to remove unwanted salt from the metallic product. The resulting product, in the form of a lightly-sintered block, is then further post processed by crushing or comminuting 16, further washing and milling 18, magnetic separation to remove ferromagnetic impurities 20, drying in argon 22, sieving or classifying 24, and packing 26 for supply to the SLM apparatus. Preferably, the product is additionally plasma spheroidised (not shown) before it is packaged for supply, as spherical metallic powder, to the SLM apparatus.

An object of a preferred embodiment of the invention is to provide a compact and highly-automated instrument for carrying out the following steps: place an oxide powder on a cathode tray, input the oxide powder on the tray to the apparatus, conduct electrolysis and retrieve the tray, feed the reduced metallic product to a processor which will crush the lightly-sintered block, or cake, of product, wash and dry the resulting metallic particulate, magnetically separate metallic impurities and subsequently bag the powder under argon for storage or spheroidisation, and supply to an additive manufacturing process.

Such an apparatus could process any titanium alloy within a range of alloying elements as well as regenerate powder previously handled by the SLM apparatus, but which has not formed part of the metallic article produced by the SLM process.

Figure 2:
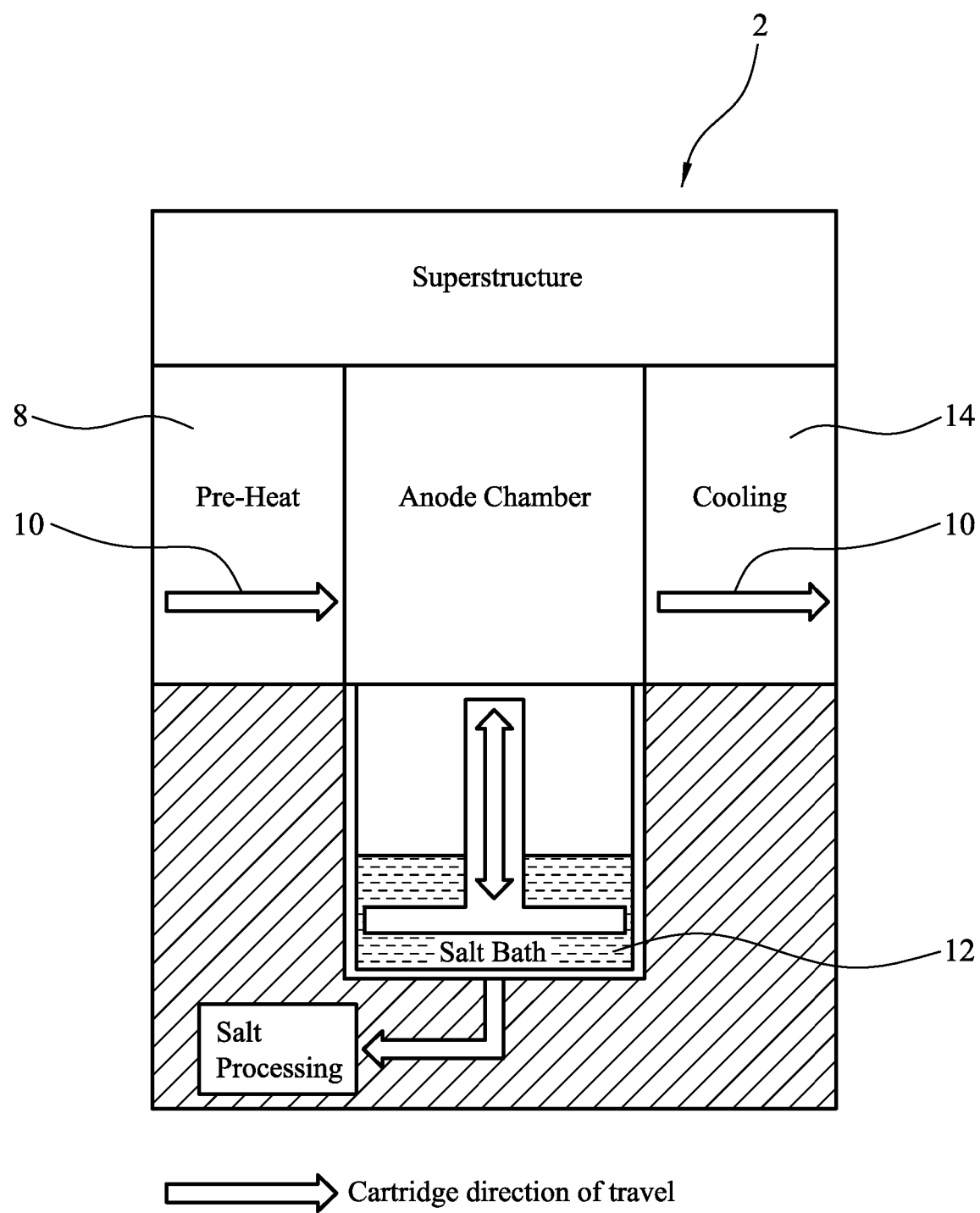
FIG. 2 is a schematic diagram of a reduction apparatus of the first embodiment of the invention.

It is envisaged that fused salt, preferably a mixture of calcium chloride and calcium oxide, in the electrochemical cell will be contained in a metal crucible provided with cathodic protection to avoid corrosion, the anode will have the ability to move up and down whilst the tray will travel transversely from the pre-heat, underneath the anode, then vertically with the anode in to the bath and (following reduction) upwards and sideways in to the cooling chamber as shown in FIG. 2.

The electrochemical cell is designed to the following specifications:

Current Density: 5000-7500 A/m2
Tray load (oxide): 6-12 kg
Cycle time: 12 to 24 h
Metal production: 5 to 8 kg/day
Anode and cathode diameter: 40 to 60 cm
Anode material: carbon
Salt inventory: 200 to 400 litres
Salt: mixture of $CaCl_2$) and CaO
Operative salt temperature: 950 C
Heating: External, with internal heating once the cell is in operation
Atmosphere: Argon in the cooling station, $CO/CO_2$ atmosphere in the electrochemical cell and normal air in the pre-heat.

Figure 3:
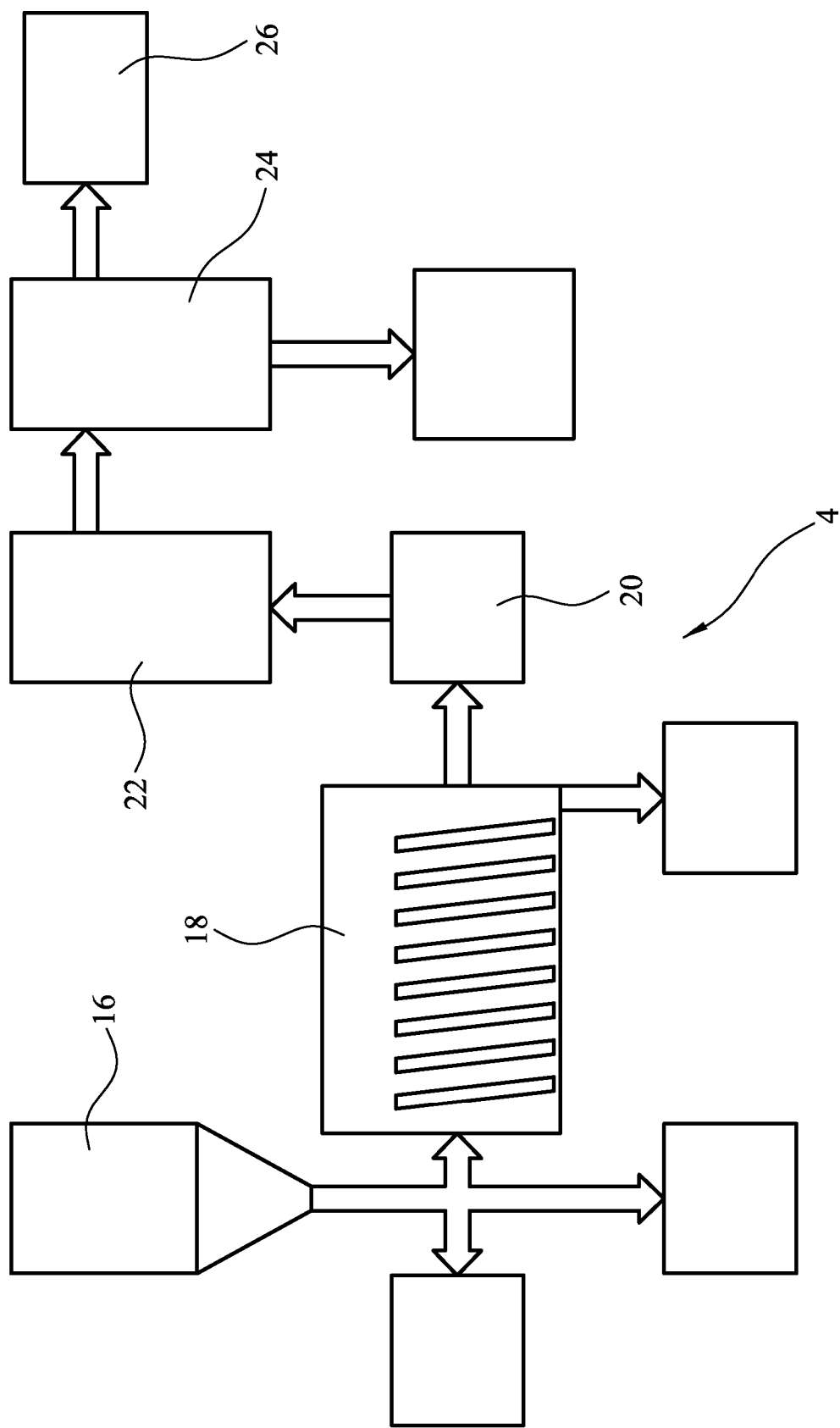
FIG. 3 is a schematic diagram of a processing apparatus of the first embodiment of the invention.

The inventors have put significant effort into optimising the post-reduction processing, and in a preferred embodiment the processor will comprise the following stages:
1. Soaking
2. Cake breaking
3. Particulate comminution
4. Wet attritioning
5. Wet magnetic separation
6. Fluid bed drying
7. Product sizing
8. Product packaging A simplified vision of the internals of this unit can be seen in FIG. 3.

The processor preferably also carried out spheroidisation, advantageously based on induction plasma technology to produce round powder particles. Particles are fed in to a chamber in which plasma is created, fall through the chamber and melt to then solidify again in spherical form.

Utilising a spheroidising unit benefits the powder produced in the following ways:
Improve powder flow
Decrease powder porosity
Improve product quality In addition to these considerations, the preferred embodiment of the invention comprises a programmable control system, for controlling the functionality described above. In addition, the control system is coupled, for example over the internet or other remote communication, to a remote server operated by a system operator. In this way the system operator can optimise the performance of the apparatus, and can control and optimise the performance of multiple similar apparatus, installed at different locations.

We claim:

1. An apparatus for manufacturing a metallic article, comprising:
   a reduction apparatus for electrochemically reducing a feedstock to a metallic product;
   a processor for converting the metallic product to a metallic powder; and
   an additive-manufacturing apparatus for fabricating the metallic article from the metallic powder;
in which the reduction apparatus, the processor and the additive manufacturing apparatus are collocated, or are located on the same site,
in which the reduction apparatus comprises an electrochemical cell in which, in use, an anode and a cathode are in contact with a fused salt and the feedstock contacts the cathode and the fused salt, and an electrical power supply for applying a cathode potential to the cathode so that the feedstock is reduced to the metallic product.

2. The apparatus according to claim 1, in which the reduction apparatus, the processor and the additive-manufacturing apparatus are collocated in the same container, or portable building.

3. The apparatus according to claim 1, in which the reduction apparatus comprises a loading unit for loading the feedstock onto a cathode and a pre-heat unit for heating the feedstock and the cathode for immersion into the fused salt.

4. The apparatus according to claim 1, in which the cathode carrying the metallic product is removable from the electrochemical cell, and in which the reduction apparatus comprises a cooling unit for cooling the cathode and the metallic product before the metallic product is processed by the processor.

5. The apparatus according to claim 3, in which, after the feedstock is loaded onto the cathode in the loading unit, the cathode carrying the feedstock is moved horizontally until it is positioned beneath the anode, and the anode and the cathode are then lowered into the fused salt.

6. The apparatus according to claim 4, in which, after reduction of the feedstock to produce the metallic product, the anode and the cathode carrying the metallic product are raised out of the fused salt, before the cathode carrying the metallic product is moved horizontally into the cooling unit.

7. The apparatus according to claim 1, in which the processor comprises a comminutor for comminuting the metallic product to produce metallic particles of the metallic product, and a classifier or screening apparatus for selecting a predetermined range of sizes of the metallic particles to form the metallic powder.

8. The apparatus according to claim 7, in which the processor comprises a spheroidising apparatus for spheroidising the metallic particles to produce the metallic powder.

9. The apparatus according to claim 7, in which the processor comprises a magnetic separator for separating ferromagnetic particles from non-ferromagnetic particles in the metallic particles or the metallic powder.

10. The apparatus according to claim 1, in which the additive-manufacturing apparatus comprises a 3D printer, a selective laser melting machine, a selective laser sintering machine, or a selective electron-beam melting machine.

11. The apparatus according to claim 1, in which the additive-manufacturing apparatus comprises a spray-coating apparatus.

12. The apparatus according to claim 1, in which the metallic powder comprises titanium or a titanium-based alloy.

13. The apparatus according to claim 1, in which a portion of the metallic powder supplied to the additive-manufacturing apparatus does not form part of the metallic product, but is oxidised by the additive-manufacturing process to form oxidised metallic powder, and in which the oxidised metallic powder is supplied as the feedstock, or as a component of the feedstock, to the reduction apparatus.

14. The apparatus according to claim 1, in which the feedstock comprises a compound containing elements corresponding to the elements forming the metallic product.

15. The apparatus according to claim 1, in which the feedstock comprises a naturally-occurring ore of the elements forming the metallic product.

16. The apparatus according to claim 1, which is capable of producing between 6 kg and 12 kg of the metallic powder per day.

17. A method for manufacturing a metallic article from a powder feedstock, comprising controlling the electrochemical reduction of a predetermined feedstock to produce a metallic product, converting the metallic product to a metallic powder, and fabricating the metallic article from the metallic powder by additive manufacturing, using the apparatus according to claim 1 wherein reduction, conversion and fabrication are collocated, or located in the same container, or the same building, or are located on the same site.

18. A control method for controlling a materials-handling, or manufacturing, apparatus comprising the reduction apparatus, the processor and the additive-manufacturing apparatus of claim 1, comprising the steps of providing control parameters or expert system control from a remote server to a locally-situated controller, and operating the locally-situated controller to control the materials-handling apparatus to produce a desired metallic article.

19. The control method according to claim 18, including the step of providing feedback from the materials-handling apparatus to the locally-situated controller, and optionally to provide feedback from the locally-situated controller, for controlling the materials-handling apparatus.

20. The control method according to claim 18, comprising the step of the remote server providing control parameters or expert system control to, and optionally receiving feedback from, a plurality of locally-situated processors coupled to respective materials-handling apparatus, optionally on different sites.

21. The control method according to claim 18, in which when a particular feedstock is provided for the materials-handling apparatus, the remote server provides control parameters to the locally-situated controller to enable the locally-situated controller to control the materials-handling apparatus to process the feedstock.

22. The control method according to claim 21, comprising the steps of, when a desired metallic product is to be fabricated from a desired metal alloy, providing a corresponding feedstock for the materials-handling apparatus and providing control parameters from the remote server to the locally-situated controller to enable the locally-situated controller to control the materials-handling apparatus to fabricate the metallic article.

23. The control method according to claim 21, comprising the step of providing the feedstock in a pre-packaged quantity of feedstock, and providing from the remote server corresponding control parameters for processing the pre-packaged quantity of feedstock to fabricate the metallic article.

24. The apparatus according to claim 11, wherein the spray-coating apparatus is a plasma spray coating apparatus.

25. The apparatus according to claim 15, wherein the ore is rutile.

* * * * *